3,309,385
7α-ACYLTHIOPROGESTERONES

Patrick A. Diassi, Westfield, N.J., assignor, by mesne assignments, to E. R. Squibb & Sons, Inc., New York, N.Y., a corporation of Delaware
No Drawing. Filed May 12, 1965, Ser. No. 455,322
12 Claims. (Cl. 260—397.3)

This invention relates to new chemical compounds, and, more particularly, to new steroids of the formula

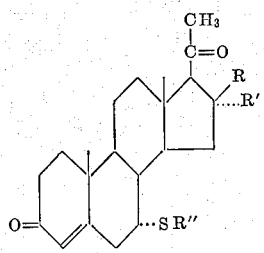

wherein R is hydrogen, R' is hydroxy, lower alkoxy, acyloxy, mercapto, or acylthio, or together R and R' is oxo; and R" is acyl. The preferred acyl groups are those of hydrocarbon carboxylic acids of less than twelve carbon atoms, such as the lower alkanoic acids (e.g., acetic, propionic and hexanoic acid), the monocyclic aromatic carboxylic acids (e.g., benzoic acid), the monocyclic ar(alkanoic) acids (e.g., phenacetic and β-phenylpropionic acid), the lower alkenoic acids, the cycloalkanecarboxylic acids, and the cycloalkenecarboxylic acids.

The new steroids of this invention are physiologically active substances that possess progestational activity and hence may be administered parenterally in lieu of known progestational agents, such as progesterone, in the treatment of habitual abortion. The new steroids also possess anti-mineralocorticoid and anabolic activities.

The compounds of this invention are prepared by reacting either 4,6,16 - pregnatriene - 3,20 - dione or 4,6-pregnadiene-16α-hydroxy-3,20-dione (or a 16-lower alkyl ether or a 16-ester thereof) with a thioacid. These starting steroids can be prepared as described in my application, Ser. No. 432,377, filed February 12, 1965. The preferred thioacids are those derived from hydrocarbon carboxylic acids of less than twelve carbon atoms, such as the thio derivatives of one of the acids mentioned hereinbefore. The reaction is preferably conducted at an elevated temperature using an excess of the thioacid.

If 4,6,16-pregnatriene-3,20-dione is used as the steroid reactant, a 7α,16α-bisacetylthioprogesterone is obtained as the product. If 4,6-pregnadiene-16α-hydroxy-3,20-dione (or a 16-ether or ester thereof) is used as the reactant, the corresponding 7α-monoacylthio-16α-hydroxy (or 16-ether or ester thereof)-progesterone is obtained as the product. To form the 7α-monoacylthio-16-ketoprogesterone product, the 7α - acylthio - 16α - hydroxyprogesterone is oxidized, as by treatment with chromic anhydride, to yield the corresponding 7α-acylthio-16-ketoprogesterone.

The following examples illustrate the invention (all temperatures being in centigrade):

Example 1.—7α,16α-bisacetylthioprogesterone

A solution of 400 mg. of 6,16-tetradehydroprogesterone in 1.0 ml. of thioacetic acid is heated at 90° for two hours, then cooled, diluted with ether, and extracted with 5% sodium bicarbonate and water, dried over sodium sulfate and evaporated to dryness in vacuo. The residue is plate chromatographed using alumina (activity V) as adsorbent and chloroform as the developing solvent. Detection of the band at $R_f \approx 0.2$ by U.V., elution with ethyl acetate and crystallization of the residue after removal of the solvent from acetone-hexane gives about 110 mg. of 7α,16α-bisacetylthioprogesterone having a melting point about 182–184°;

$[\alpha]_D^{22}$ −27.5° (chloroform), $\lambda_{max.}^{alc.}$ 237 mμ (ε, 23,650);

$\lambda_{max.}^{Nujol}$ 5.90, 5.94, 6.15μ; $\tau_{CDCl_3}^{Si(Me)_4}$ 4.28 (s, 4–H), 5.72 (d 9.5 c.p.s., 16β–H), 6.08 (m, 7β–H), 7.65 (s, S—$\overset{\text{O}}{\overset{\|}{\text{C}}}$—CH$_3$), 7.74 (s, —S—$\overset{\text{O}}{\overset{\|}{\text{C}}}$—CH$_3$), 7.84 (s, 21–CH$_3$), 8.78 (s, 19–CH$_3$), 9.26 (s, 18–CH$_3$).

*Analysis.*—Calcd. for $C_{25}H_{34}S_2O_4$ (462.65): C, 64.89; H, 7.40; S, 13.86. Found: C, 64.93; H, 7.32; S, 13.85.

Example 2.—7α-acetylthio-16α-hydroxyprogesterone

Following the procedure of Example 1 but substituting 202.7 mg. of 6-dehydro-16α-hydroxyprogesterone for the 6,16-tetradehydroprogesterone and using 0.4 ml. of thioacetic acid there is obtained about 98.3 mg. of 7α-acetylthio - 16α - hydroxyprogesterone having a melting point about 180–182°, $[\alpha]_D^{24}$ −17.6° (chloroform), $\lambda_{max.}^{alc.}$ 238 mμ (ε, 19,200), $\lambda_{max.}^{Nujol}$ 2.98, 5.88, 5.94, 6.08, 6.20μ; $\tau_{CDCl_3}^{Si(CH_3)_4}$ 4.31 (s, 4–H), 5.19 (m, 16β–H), 6.08 (m, 7β–H), 7.66 (s, —S—$\overset{\text{O}}{\overset{\|}{\text{C}}}$—CH$_3$).
7.83 (s, 21–CH$_3$), 8.78 (s, 19–CH$_3$), 9.30 (s, 18–CH$_3$),

*Analysis.*—Calcd. for $C_{23}H_{32}O_4S$ (404.56): C, 68.27; H, 7.97. Found: C, 68.10; H, 7.76.

Example 3.—7α-acetylthio-16α-methoxyprogesterone

Following the procedure of Example 2 but substituting 6-dehydro-16α-methoxyprogesterone for the 6-dehydro-16α-hydroxyprogesterone, there is obtained 7α-acetylthio-16α-methoxyprogesterone.

Example 4.—7α-acetylthio-16-ketoprogesterone

To a stirred solution of 100 mg. of 7α-acetylthio-16α-hydroxyprogesterone in 10 ml. of reagent grade acetone, there is added dropwise an aqueous solution containing 20 mg. of chromic anhydride and 32 mg. of sulfuric acid per milliliter until the oxidizing agent is no longer decolorized. After five minutes the excess oxidizing agent is destroyed by adding a few drops of methanol and the mixture is slowly diluted with water. The crystals which separate are filtered, washed with water, and dried to give 7α-acetylthio-16-ketoprogesterone.

Example 5.—7α-acetylthio-16α-acetoxyprogesterone

A solution of 50 mg. of 7α-acetylthio-16α-hydroxyprogesterone in 3 ml. of pyridine (dry) and 1 ml. of acetic anhydride is kept at room temperature for sixteen hours, then diluted with ice water and extracted with chloroform. The chloroform is washed with water and evaporated to dryness in vacuo. Crystallization of the residue gives 7α-acetylthio-16α-acetoxyprogesterone.

Example 6.—7α,16α-bispropionylthioprogesterone

Following the procedure of Example 1, but substituting thiopropionic acid for the thioacetic acid, 7α,16α-bispropionylthioprogesterone is obtained.

Similarly, by substituting any other thioacid for the thioacetic acid in the procedures of Examples 1, 2 and 3, the corresponding thioesters are obtained.

The invention may be variously otherwise embodied within the scope of the appended claims.

What is claimed is:
1. A compound of the formula

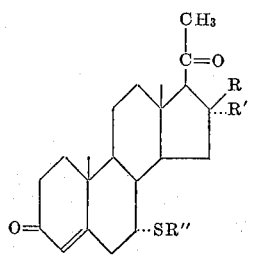

wherein R is hydrogen, R' is selected from the group consisting of hydroxy, lower alkoxy, the acyloxy radical of a hydrocarbon carboxylic acid of less than twelve carbon atoms, and the acylthio radical of a hydrocarbon thiocarboxylic acid of less than twelve carbon atoms, and together R and R' is oxo; and R'' is the acyl radical of a hydrocarbon carboxylic acid of less than twelve carbon atoms.

2. 7α,16α-bis(lower alkanoylthio)progesterone.
3. 7α,16α-bisacetylthioprogesterone.
4. 7α,16α-bispropionylthioprogesterone.
5. 7α-(lower alkanoylthio)-16α-hydroxyprogesterone.
6. 7α-acetylthio-16α-hydroxyprogesterone.
7. 7α-(lower alkanoylthio)-16α-(lower alkoxy)progesterone.
8. 7α-acetylthio-16α-methoxyprogesterone.
9. 7α-(lower alkanoylthio)-16-ketoprogesterone.
10. 7α-acetylthio-16-ketoprogesterone.
11. 7α-(lower alkanoylthio)-16α-(lower alkanoyloxy)progesterone.
12. 7α-acetylthio-16α-acetoxyprogesterone.

References Cited by the Examiner
UNITED STATES PATENTS
2,904,560   9/1959   Dodson et al. _____ 260—397.3

OTHER REFERENCES
Smith et al.: Jour. Med. Chem., pp. 531–537, July 1964, pp. 531 and 532 relied on.

ELBERT L. ROBERTS, Primary Examiner.

LEWIS GOTTS, Examiner.

HENRY A. FRENCH, Assistant Examiner.